July 3, 1923.
E. BUFFINGTON
1,460,700
COMBINED PICTURE BOOK AND PUZZLE
Filed April 15, 1922
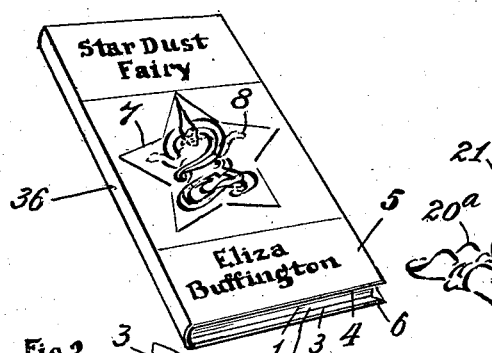
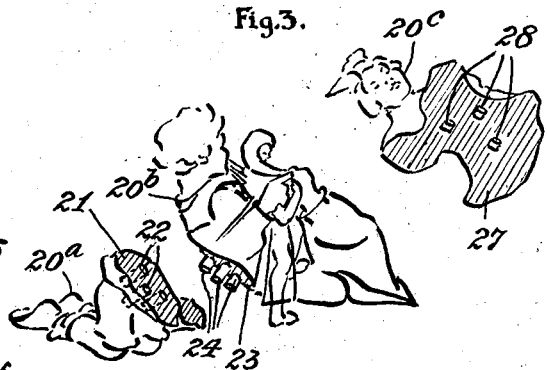
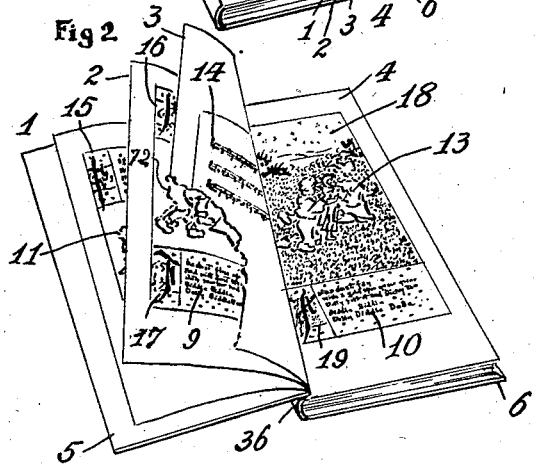
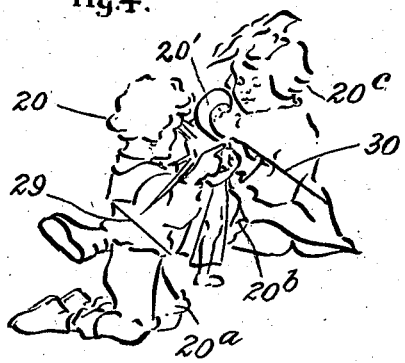
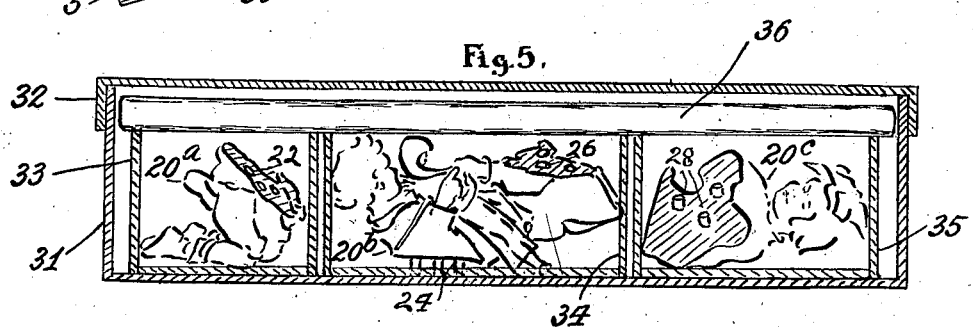
Inventor
Eliza Buffington,
By her Attorney
Willis Fowler.

Patented July 3, 1923.

1,460,700

UNITED STATES PATENT OFFICE.

ELIZA BUFFINGTON, OF MADISON, NEW JERSEY.

COMBINED PICTURE BOOK AND PUZZLE.

Application filed April 15, 1922. Serial No. 552,837.

*To all whom it may concern:*

Be it known that I, ELIZA BUFFINGTON, a citizen of the United States, and resident of Madison, in the county of Morris and State of New Jersey, have invented certain new and useful Improvements in Combined Picture Books and Puzzles, of which the following is a specification.

In the art of amusement devices for children, it is desirable and important to have an educational and constructive element enter into the same as an essential part thereof, so that the juvenile mind, while led on by the amusing character of a device to keep the child's attention directed along a certain line, may at the same time have imparted thereto something of educational and constructive value. In pursuance of this purpose, I have provided certain improvements in the way of a book having educational, instructive and amusement qualities together with associated puzzle means having qualities on the same order and which, though physically separated from said book-element, is inter-related therewith, so that the two said elements are used conjointly in carrying out the scheme by which they are co-related.

The construction and arrangement by means of which I have carried out the above stated idea, is that of a book having in printed text a certain story or theme and pertinent pictures illustrating or portraying certain parts or characters of the text, and a detached sectional-statuette or figurine embodying a certain selected object or character from the text, or series of pictures, or both, the sections of the statuette being normally separated and their proper assemblage into the completed outstanding figure, being left to the child who at the time is using or is participating in the use of the book. To this is added the interesting and important feature of having the sectional-statuette, formed in the round, that is to say, made in full relief, or raised parts at all places around the figure or figures composing the sectional-statuette, in contradistinction to pieces in flat form or bas-relief. When the statuette includes a figure or figures of living beings representing characters referred to in the book, a more animated spirit is thereby given to the puzzle-device and the interest of the user is accordingly increased. The puzzle-device is also made more artistic and instructive by reason of the statuette being modeled in the round.

The text matter may be in verse form and the same set to music which may also be printed in the book, so that the child may use the score to play or sing from, or someone who may be instructing the child may so use the musical composition. The pictures illustrating the book may be in color and show figures of human beings in dancing poses and thus carry out the idea underlying the particular book herein shown, namely, that of the rhythmical unity of the five arts, which I have symbolized by a five-pointed star representing verse, music, dance, painting and sculpture.

Other objects of the invention will hereinafter appear from the description of the particular form of the present embodiment of my invention which I have herein illustrated in the accompanying drawings, wherein, Fig. 1, shows a perspective view of the book in closed condition.

Fig. 2, shows a perspective view of the book opened at several of its pages.

Fig. 3, shows a perspective view of the three detached sections or parts composing the complete statuette in reproduction of certain characters found in the book.

Fig. 4, is a perspective view of the built-up statuette-puzzle, composed of the three separate sections shown in Fig. 3.

Fig. 5, is a vertical sectional view of a box having a removable cover and in which the detached pieces of the puzzle-figurine and the book are packed for storage.

Referring to the drawings, in which like numerals of reference designate like parts throughout, the leaves 1, 2, 3, 4, etc., are suitably bound between the covers 5 and 6, into a substantial book. In the center of the outer face of the cover 5, is illustrated a star 7, with five points and its field bears an artistic figure or symbol 8, while the title of the book "Star Dust Fairy" appears across the upper part of the cover and the name of the applicant and author is arranged across the bottom part of said cover.

On the different pages of the various leaves composing the book, I arrange text matter, indicated at 9 and 10, on the respective leaves 2 and 4, also pictures or illustrations 11, 12 and 13, on the respective leaves 1, 2 and 4, also musical scores, indicated at 14, on leaf 3, and various borders, panels and backgrounds, indicated at 15, 16, 17, 18, and 19, on the respective leaves 1, 2, 3 and 4.

The text and the illustrations in the book tell or depict a certain juvenile story, the burden of which may be of any suitable character designed to instruct and amuse the child, and there may be song verses set to the music which is printed in the book, as indicated at 14. In the present instance, the story or theme which I have portrayed in the book and have entitled "Star Dust Fairy," is in verse, as indicated in the drawings, and the text is illustrated with the various pictures showing certain of the characters in different poses, some dancing and others at rest in different attitudes, while all or some of the verses are songs accompanied by music; and in this way the story that is told by the book may be imparted to the child, by reading to it the text and showing the pictures in turn, and singing the song or playing the music at the proper time. In thus using the book, the child is naturally much interested in the pictures illustrating the story and will follow them keenly and they will impress the child perhaps more than the text matter, and following this trend of thought in the child's mind, so vividly created by the pictures, I utilize the same in conjunction with a detached statuette-puzzle which substantially reproduces in the round, certain parts or figures of one of the series of pictures, which the child has just viewed with such interest. Such a statuette-puzzle is shown in Figs. 3 to 5, and comprises two figures 20, a boy and girl, respectively, the one in kneeling position and the other seated, looking towards each other with a fairy 20' held in their hands, the statuette being a substantial reproduction in relief, of the picture figures shown at 13, in the illustration on leaf 4, of the book, and wherein the two said figures are portrayed as seated or kneeling on the turf in a field or lawn, with flowers and sky shown in the background. This statuette 20, is formed in several separable sections 20ª, 20ᵇ, and 20ᶜ, the meeting faces of which are on transverse oblique planes, with co-operating uniting pins and sockets, so that when the adjacent sections are properly assembled or mated, the pins and sockets will hold the parts together in completed form.

In the present construction, I show the statuette as formed in three sections with the contacting face 21, of section 20ª, provided with a series of sockets 22; the contacting face 23, of the section 20ᵇ, provided with a corresponding series of studs or pins 24; the contacting face 25, of the section 20ᵇ, provided with a set of sockets 26, and the contacting face 27, of the section 20ᶜ, provided with the pins 28, for engagement with the sockets 26. The three separate sections shown in Figs. 3 and 5, are to be put together, as a puzzle-device, in the completed form shown in Fig. 4, the contacting faces 21 and 23, coming together on the diagonal plane indicated at 29, in said figure, and the contacting faces 25 and 27, making contact of the oblique plane indicated at 30, in said figure.

It will be noted that the co-operating interlocking pins and sockets for holding the sections together in assembled form, are disposed in sets of more than two of the same, and they are arranged equal distances apart about a central point, so that the pins may be entered in the sockets even though the sections are not in proper place or alignment. For example, the sockets 22 and co-operating pins 24, are so disposed that lines joining them will form an equilateral triangle, and the same arrangement is carried out with the other sockets and pins on the other contacting faces. The purpose of this construction is to make it more difficult and puzzling for the child to assemble the sections, than where, for instance, one pin and socket is used. By increasing the number of pins and sockets in the group, the chances are accordingly increased against the proper assemblage of the sections at the first try. Where three pins and sockets are used, there will be two wrong positions in which two adjacent sections may be placed, to one right one, and so on with the increase in number of these interlocking elements.

By virtue of having the sectional statuette made in the round and showing in relief from all points around a circle, I increase the puzzling effect in an evident manner, and the child is compelled to work over each section as he picks it up, as he finds it necessary to turn and shift the piece as he tries to fit it to another, in order to bring it into proper relative position therewith, and this is particularly true where the child uses the picture in the book as a guide in putting together the sections of the statuette, because the picture being in the flat, it necessarily presents but one point of view from a particular point on a circle, whereas the statuette sections present views from all the points of a circle. For this reason, I am able to provide the puzzle element with the additional and novel feature of apparent dissimilarity between the two things, to wit, the picture element and the statuette puzzle-element, since the child in taking up the sections indiscriminately will not be apt to hold them in the position revealed by the picture, and while he will be able to see a certain similarity between the two, he will nevertheless be puzzled over the matter and made to ponder over it until he solves it by getting the section of the statuette in substantially its correct position before he can apply it to its mate. As there are several sections to the statuette, each one will cause the child to be puzzled and mystified in the same way and require him to work out the solution of the same by moving or shifting the parts into full agreement. Thus it will be seen that even though the child should use the picture in the book as a guide in assembling the puzzle-sections, the wide difference between figures in the flat as shown in the guiding picture and figures in the round, as they appear in the statuette and particularly in separated sections thereof, imposes a certain desirable complexity upon the puzzle-element which results in perplexing and mystifying the child so that he must make some effort to solve the puzzle. This particular feature is of importance in the combination of the picture-element and the separated puzzle-element, and also where the sectional-statuette is used alone as a puzzle device, for it will be understood that the sectional-statuette may be used as a puzzle independently of the book.

While I have described the puzzle-statuette as comprising figures taken from a certain picture in the book, it is evident that the figure or figures of the statuette may not thus follow a picture, but may follow the text and represent characters or figures depicted in words in the text.

The sections of the statuette may be varied in number as desired, and the planes on which the statuette is divided into sections may be changed in numerous ways, and may be made curved or zig-zag, or in any other way, but it is perhaps better to have the meeting faces of adjacent sections formed flat, in order to increase the difficulty of the child in assembling the parts.

In the use of my invention, the story and the illustrations will be made more real to the child, because he can see and actually handle the little figures or statuette, which may be made in one color, or may be particolored, or variegated, though the single color effect will give less clue to the correct assembling of the sections. The educational value of a puzzle in the round is greater than one in the flat, because it introduces the third dimension.

In using the symbol of a star, I make it with five points to represent the five arts of verse, music, dance, painting and sculpture, the rhythmical unity of which I make the underlying idea of the whole book to enhance its value as an educational means, at the same time affording great amusement to the child.

I have made the sectional statuette of molded or cast plastic material, such as clay, in solid or non-hollow form. However, any suitable material may be used for this purpose, and while the complete statuette formed in one-piece is still soft or green, it may be cut or sliced into the desired sections, and the meeting-faces of the sections then provided with the uniting pins and sockets. Wood or any suitable compositions may be employed for the statuette, also paper or fibrous compositions, as well as rubber, or celluloid. When the device is not in use, or is to be stored or transported, it may be conveniently packed in a box 31, having a removable cover 32, with three open-top trays 33, 34 and 35, fitted removably in the box and adapted to receive and hold the respective sections 20$^a$, 20$^b$ and 20$^c$, of the statuette. Between the top of the trays and the box-cover there is sufficient space for receiving the book, indicated at 36, and by this means the device is compactly stored.

It will be noted that the description of the dance which is illustrated by some of the pictures which are made from actual photographs of the dancers, is also in the text in the book. As there are numerous pictures in the book, the child is left to himself to pick out the one which is reproduced in part or whole in the statuette puzzle, and in this way the puzzle is made less simple than where the child is informed as to the particular picture which has been selected for the puzzle element.

I wish to be understood as not limiting my invention to the particular construction of the same as herewith shown, for it is manifest that various changes may be made in the different parts thereof, without, however, departing from the spirit of the invention.

Having thus described my invention, what I claim and desire to secure by Letters Patent is:—

1. A puzzle device comprising a figurine or figurines in the round in statuette form and consisting in separable sections, said sections having contacting faces fitting together, said sections further having their outer surfaces merging inconspicuously into each other when assembled, thereby forming the complete statuette.

2. A juvenile educational device including a picture in which is represented an object, combined with a sectional figurine having the sections separable and each provided with meeting-faces fitting together when assembled and the complete figurine formed by said contacting sections representing the same object as the picture, said picture-object serving as a guide in assembling the said sections of the figurine.

3. A juvenile amusement and educational device comprising a book containing a story told in inter-related text and pictorial matter, in combination with a detached but related puzzle-figurine in substantial reproduction of part or parts of one of said pictures in the book and modeled in the round or in statuette form and made in separable sections capable of being put together by the child into the complete statuette in agreement with said selected picture-feature.

4. A puzzle device comprising a figurine or figurines in the round in statuette form and consisting in separable sections having contacting faces fitting together, said sections further having their outer surfaces merging inconspicuously into each other when assembled thereby forming the complete statuette, the meeting-faces of the various sections being provided with interlocking means for retaining the parts together when properly assembled, the plane on which any two meeting-faces meet being disposed angularly with reference to the plane of any other two meeting-faces.

5. A puzzle device comprising a statuette of a figure or figures in the round and made in separable sections constructed to be put together in a certain order to complete the statuette, the meeting-faces of the different sections being provided with inter-locking means for properly uniting the sections, and said means comprising sets of members disposed equal distances apart at the angles of a polygon formed by lines joining said points to make the correct assemblage of the sections more complex.

Signed at New York, in the county of New York and State of New York, this 14th day of April, A. D. 1922.

ELIZA BUFFINGTON.